Oct. 3, 1950     O. THEIMER     2,524,549
TURBINE

Filed July 11, 1945     8 Sheets-Sheet 3

INVENTOR.
OSCAR THEIMER

Oct. 3, 1950     O. THEIMER     2,524,549
TURBINE

Filed July 11, 1945     8 Sheets-Sheet 4

INVENTOR.
OSCAR THEIMER

INVENTOR.
OSCAR THEIMER

Oct. 3, 1950     O. THEIMER     2,524,549
TURBINE

Filed July 11, 1945     8 Sheets-Sheet 6

INVENTOR.
OSCAR THEIMER

Oct. 3, 1950     O. THEIMER     2,524,549
TURBINE

Filed July 11, 1945     8 Sheets-Sheet 7

Fig. 12

INVENTOR.
OSCAR THEIMER

Patented Oct. 3, 1950

2,524,549

UNITED STATES PATENT OFFICE 2,524,549

TURBINE

Oscar Theimer, New York, N. Y.

Application July 11, 1945, Serial No. 604,383

15 Claims. (Cl. 60—41)

This invention refers to improvements in or relating to rotary engines and more particularly to turbines. The invention contemplates a new working method for turbines which is highly economical and may be carried out with any kind of fuel or power medium, such as gas, steam, water and the like.

One of the objects of the present invention is the provision of a turbine which utilizes repeatedly by action and reaction the latter similar to jet propulsion one and the same power medium and which does not discharge said power medium until its highest possible expansion has taken place within the turbine and has been fully utilized and transformed into driving power.

Another object of the present invention is the provision of a turbine in which the compression of the power medium is contemplated to reach its highest degree immediately prior to ignition or, in case of steam, the highest tension thereof is brought about immediately before expansion.

Still another object of the present invention is to provide a turbine in which the flow of the power medium to the rotor occurs in a straight, substantially unbroken line and the impulse resulting from the expansive or explosive force of the power medium is immediately directed from an improved nozzle to the rotor to thereby attain the least possible heatdrop of the power medium and the most favorable impulsive force thereof.

Yet a further object of the present invention is the provision of a turbine equipped with a most effective injection nozzle giving high efficiency to the injected power medium.

Still another object of the present invention is to provide a turbine with equal radial diameters and weights for each rotary stage, this being very advantageous because of the avoidance of additional strains and stresses exerted on additional rotary stages which are present in known turbines.

A further object of the present invention is the provision of an engine in which the expansion of the power medium is directed in a substantially radial direction through circumferentially arranged stages, thus reducing the length of the engine, although the length of the passage of the power medium is increased, the increased working surface also making repeated use of the impulse forces of the power medium and also of its repulsion forces.

Still another object of the present invention is the provision of a turbine which in the case of an internal combustion turbine is designed so that the important working parts exposed to high temperatures are effectively cooled by means of a comparatively simple but very reliable and efficient cooling system without resorting to a particular cooling aggregate and impairing only to a small extent the effectiveness of the power medium and the power derived from said medium. This loss of efficiency caused by the brake effect in consequence of the air resistance against the rapid revolving rotor is considerably compensated by the work done upon the inner walls of peculiar curved rotor air cooling canals, which are open at both ends, that is on the inner- and outer rotor peripheries.

This work is caused by the air flow circulating with high velocity through the rotor air cooling canals in like manner when gas power medium is circulating through the rotor gas canals. The air circulation is caused by a violent suction on account of the difference of air pressure between the inner and outer rotor peripheries.

Above mentioned loss of efficiency by means of the brake effect is further quite compensated by the forces of impulse and repulsion, first on entering of the air flow at the inner rotor periphery into the rotor air cooling canals and second when escaping from the rotor air cooling canals at the outer rotor periphery.

A still further object of the present invention is the provision of a turbine in which detrimental friction is effectively reduced because the power medium while passing through the power canals is simultaneously revolving in an enclosed condition within the stationary turbine casing, therefore no contact and no detrimental friction of the power medium with the walls of the stationary casing during its passage through the rotor power canals is taking place.

Still another object of the present invention is to provide a turbine in which detrimental back pressure is effectively reduced within the rotor because the exhaust of the power medium is (by means of the centrifugal force during a sufficient part of time of the revolution of the rotor) practically entirely expelled from the rotor before a new charge of the power medium is applied to the rotor.

Another object of the invention is the provision of means for obtaining effective sealing conditions for the turbine against leakage of the hot media derived from the combustion before expulsion of said media.

These and other objects and advantages of the invention will become more apparent as the following description of the several embodiments of the invention progresses which are illustrated on the attached drawings, in which

Fig. 2d is the discharge unit in modified form connected with the injection nozzle shown in section;

Referring now particularly to the drawings, Figs. 1, 2, 2a and 3 illustrate one preferred embodiment of the invention which can be used without substantial changes as an internal combustion turbine or steam turbine and comprises principally a substantially ring-shaped rotor 1 which is secured to a shaft 2 and turns within an outer guide body or housing 3 and an inner guide body 4, the latter being preferably in the form of a drum. The outer guide body 3 is provided with an inner rim part 3a. The inner guide body 4 is provided with an outer rim part 4a. From the outer guide body 3 extends toward said shaft 2 at opposite sides of said rotor 1 guide body plates 6 and 7.

Figure 1:
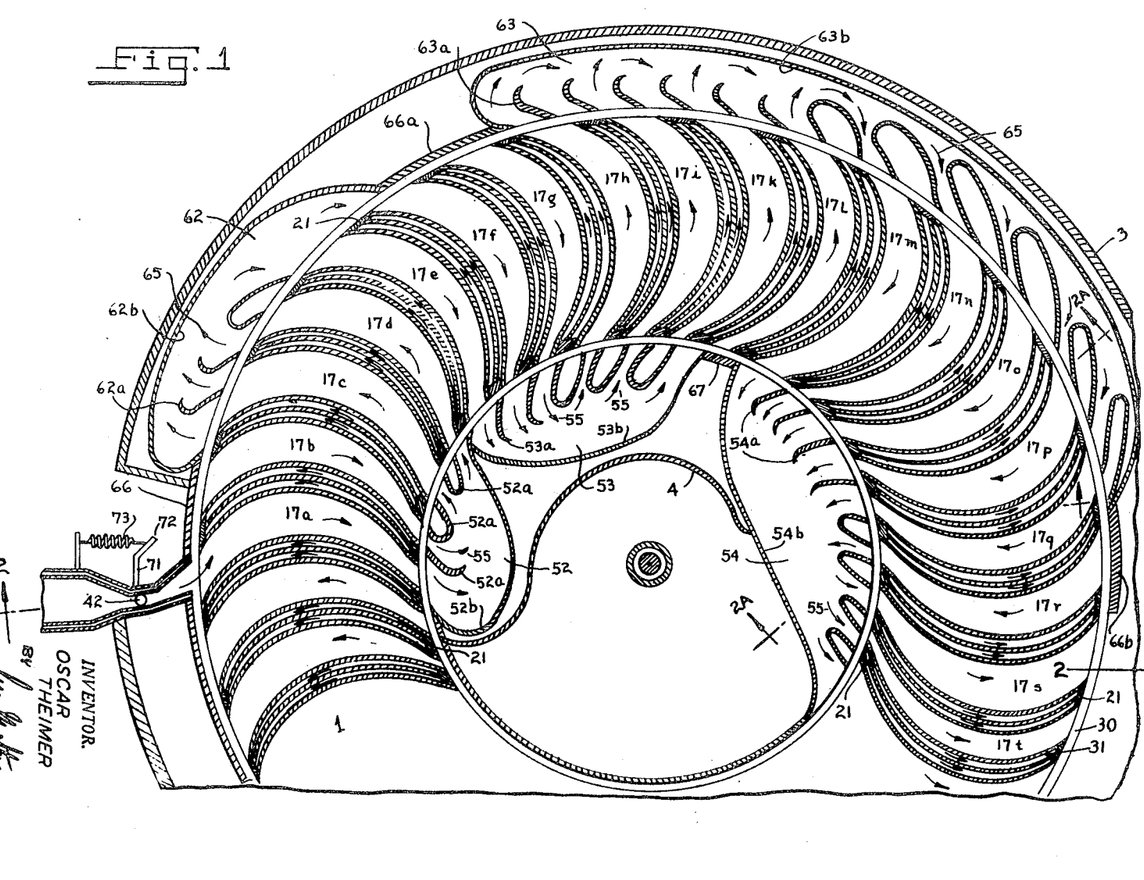
Fig. 1 is a partial cross-sectional view of a preferred embodiment of my invention taken along line 1—1 of Fig. 2.

Rotor 1 has the outer rotor rim member 8 and inner rotor rim member 9.

The rotor hub 10 which is secured to shaft 2 by means of a feather connection 11 or in any other suitable manner, is connected to members 8 and 9 of rotor 1 by means of a rotor disc 13 also called rotor supporting member which may be integral with or otherwise fastened to hub 10 and with members 8 and 9. Members 8 and 9 of the rotor 1 are further supported by a ring-shaped rotor disc 12 also called rotor supporting member with suitable cut outs 14 also called passage ways through which a cooling medium, preferably air, may enter in accordance with arrows A (Fig. 2) from apertures 37 provided in guide body plate 6. The inner and outer guide body and the rotor as well as other parts of the turbine may be constructed in sections in order to facilitate assembling of the turbine.

Figure 2:
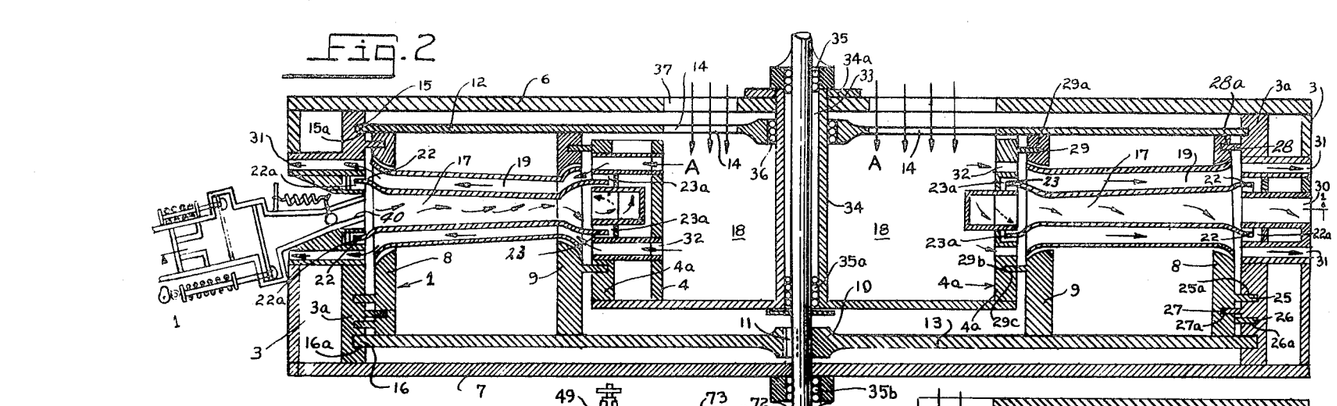
Fig. 2 is a vertical section taken along line 2—2 of Fig. 1.
Figure 2A:
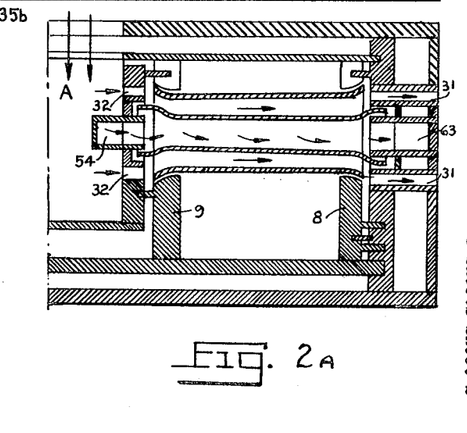
Fig. 2a is a fragmentary vertical section taken along line 2a—2a of Fig. 1.

The outer portions 15 and 16 of discs 12 and 13 of the rotor 1 are circular and adapted to run in corresponding annular grooves 15a and 16a provided in the inner rim part 3a of outer guide body 3, as may be seen in Fig. 2, to thereby obtain effective sealing means for the turbine.

Between the inner and outer rotor rim members 8 and 9, there are disposed power canals or power medium directing means 17 which, in this instance, are arranged in fixed relation to the rotor, but may also be interchangeably mounted thereon not shown in the drawings and extend in radial direction from the inner rotor rim member 9 and a predetermined distance from shaft 2, thereby providing between the shaft 2 and rotor rim member 9 a chamber 18 for supply and passage of air or of another suitable cooling medium. The power canals 17 terminate adjacent the outer rotor rim member 8.

Rotor 1 may be made as a unit from a disc-shaped casting containing said power canals 17 whose walls may be provided with metallic or fireproofed coatings (not shown) or other interchangeable protective means in order to protect the interior of said power canals.

These rotor power canals 17, particularly in the case of an internal combustion turbine, may be surrounded by cooling canals 19 which both power and cooling canals are curved in the direction of movement of the rotor, the curvature forming preferably a part of an absolute or an approximate logarithmic spiral.

These canals or directing means for the power medium and for the cooling medium are curved at opposed ends; these curvatures on both ends are situated with respect to the inner and outer rotor peripheries in an angle directly opposite to the direction of the rotor movement. (Fig. 1.)

The rotor forms a revolving casing within the stationary outer and inner guide bodies of the turbine.

Due to the fact that the power medium and the cooling medium are simultaneously moving in an enclosed condition while passing through the revolving directing means 17 and 19 of the power medium and cooling medium, respectively, within the rotor 1 contact and detrimental friction of the power and cooling medium with the walls of the stationary turbine housing during their passage through the turbine is effectively reduced.

Both canal means are open at said opposed ends, therefore allowing the expansion of the power medium and contributing to the circulation of the cooling medium.

This turbine may also be constructed to include more than one rotor as herein described not shown in the drawings, said rotors working on the same principle and method as the single rotor. A plurality of rotors may be fixed on the same shaft and one or more rows of power and cooling canals may be arranged in each rotor while the outer guide body and the inner guide body of the turbine will be readily modified to correspond to the number and type of rotors employed.

The width of the curved power canals 17 is preferably gradually increased from its inner rotor rim member 9 toward the outer rotor rim member 8 and being thus tapered from the outer rotor rim member 8 toward the inner rotor rim member 9 (Fig. 1). The surrounding cooling canals 19 are shaped and curved correspondingly.

The cross section of the power canals 17 and of the cooling canals or jackets 19 may be of any suitable configuration, such as elliptical, oval, oblong, rectangular, round. In the present instance, they are substantially elongated (Fig. 3), and the cooling canals 19 surrounding the power canals 17 may be similarly shaped or may be guided around the power canals in spiral form.

Struts, ribs or any other suitable means 20 (Fig. 3) may be used to enhance the sturdiness and stability of the construction and to assure a most effective circulation of the cooling medium around the power canals. The cooling canals 19 are each partially covered by suitable means, such as plates 21 (Fig. 3), disposed at the outer and inner periphery of the rotor 1 and at locations thereof where the hot power medium discharged from the nozzle and guide pocket units into the power canals is effectively prevented from entering into the cooling canals 19.

Suitably shaped ring members forming extensions 22 (Figs. 2, 2b, and 3) and 23 (Fig. 2) of the rotor 1 and positioned adjacent the power canals engage correspondingly shaped annular grooves 22a, 23a provided (Fig. 2), respectively, in the inner rim part 3a of the outer guide body 3 and in the outer rim part 4a of the inner guide body 4 to act as effective sealing means. Extensions 22, 23 and grooves 22a, 23a may be constructed to form inner and outer gas traps, such as exemplified by numeral 24 in Fig. 2b, against escape of the power medium.

Figure 2B:
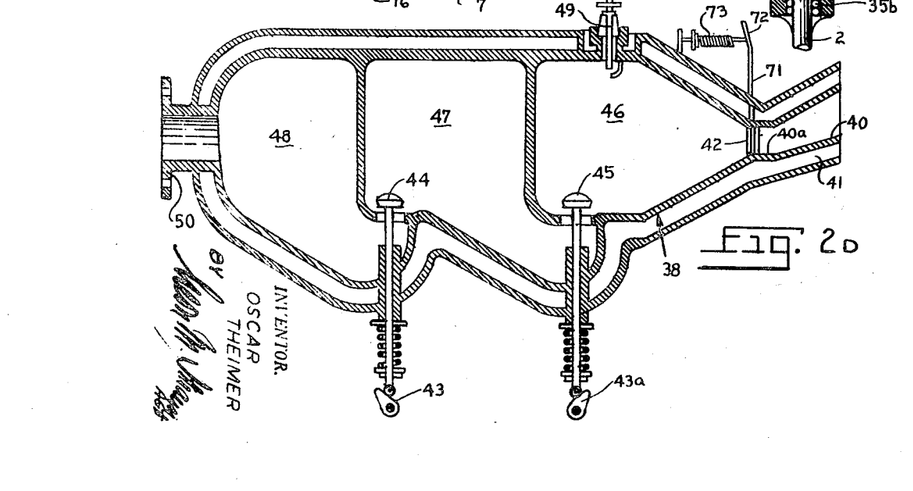
Fig. 2b is a sectional view of a detail of the turbine to which reference is made in the specification.
Figures 2B, 2C:
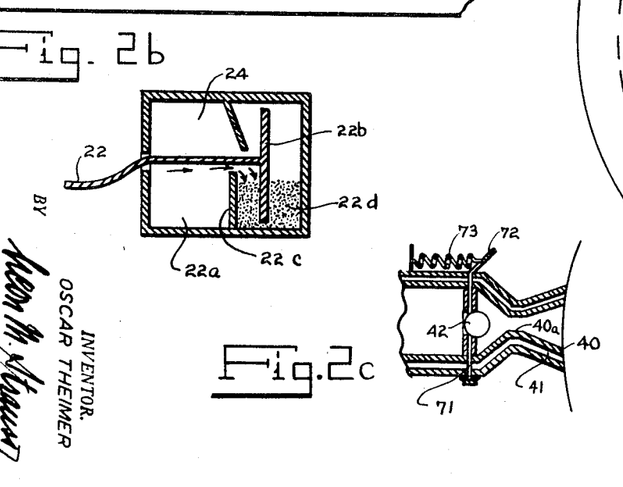
Fig. 2c shows diagrammatically an embodiment of the injection nozzle employed in the invention.
Figure 3:
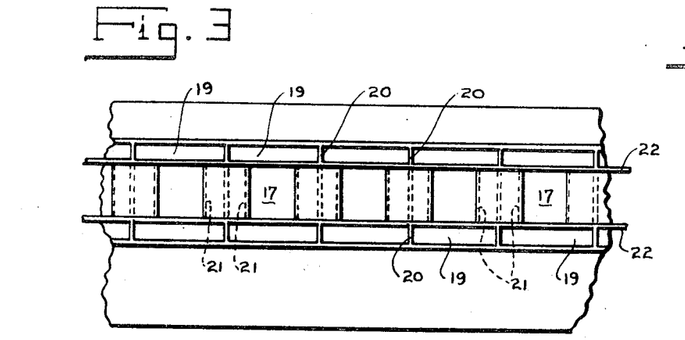
Fig. 3 is a fragmentary elevational view of the rotor.

Gas trap 24 comprises, respectively, extensions and grooves 22, 22a, 22b, 22c, 22d (Fig. 2b).

The remaining gas traps are built and function in the same manner as herein referred to in connection with gas trap 24 (Fig. 2b).

Figure 13:
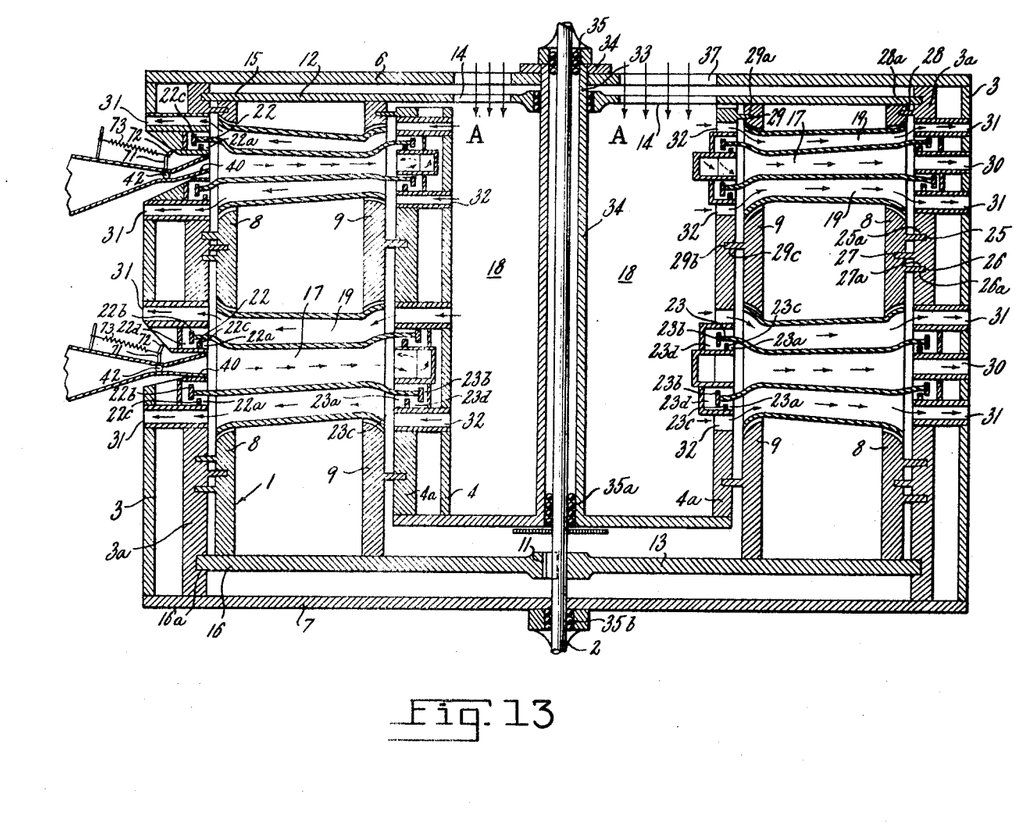
Fig. 13 is a vertical sectional view of a somewhat modified embodiment of that seen in Figs. 1 and 2.

Rotating projections 22, 23 (Fig. 2) of the rotor extend into these grooves of both said guide bodies, which projections guide that part of the power medium tending to escape between the rotor and said guide bodies. Each of these projections 22, 23 are further provided with end rims 22b, 23b, Fig. 2b, Fig. 13. Upper and lower end rims 22b, 23b are revolving within said grooves 22a, 23a, Fig. 2b, Fig. 13, of the respective guide bodies. These grooves contain circumferentially directed partitions 22c, 23c, Fig. 2b, Fig. 13, terminating short of said extensions of the rotor. Between these partitions 22c, 23c and the end walls of these grooves, containers 22d, 23d, Fig. 2b, Fig. 13, are formed which may be filled with suitable heat-resistant sealing material for instance graphite, graphite compounds, etc., with which the projecting rims 22b, 23b, Fig. 2b, Fig. 13, engage.

Portions of said power medium escaping through the gap between said rotor and inner and outer guide bodies will not be able to take its course in downward direction between partitions 22c, 23c and end rims 22b, 23b and are therefore blocked and held back by the sealing material within said containers above referred to, Fig. 2. Numerals 23b, 23c, 23d are not shown on the drawing because Fig. 2b shows the numerals 22, 22a, 22b, 22c, 22d which items are equal to all item numerals 23.

As may be seen in Fig. 2, sealing means 25, 26, 29b of rotor 1 and 27, 28 of outer guide body rim part 3a and 29 of inner guide body rim part 4a engage in corresponding grooves 25a, 26a, 27a, 28a, 29a and 29c to provide sealing means.

Within the outer guide body 3 and within the inner guide body 4 are positioned adjacent said outer and inner rotor rim members 8 and 9 a plurality of inner guide pockets or guide pocket units 52, 53, 54 and outer guide pockets 62, 63. Instead of these units, guide canals could be arranged.

The guide pocket units are, respectively, provided with a plurality of stationary guide members 52a, 53a, 54a, 62a, 63a which function in some cases somewhat similar to nozzles, thereby increasing the speed of the power medium entering the rotor power canals. The guide pocket units have further guide walls 52b, 53b, 54b, 62b, 63b (Fig. 1). Instead of guide pockets, guide ducts may be arranged.

Due to the circumferential arrangement, the radial weights and radial distances of the rotor stages are kept substantially equal to eliminate increasing strain to each following stage, although each turbine stage including the respective rotor sections are relatively enlarged in circumferential direction. The walls of the guide pocket units and of its guide members are shaped and arranged in such a manner that they will guide the power medium from and to the periphery of the outer and inner rotor member, as will be hereinafter explained. Exhaust openings 30 are arranged within the outer guide body 3 (Fig. 2), to allow the escape of the used power medium; further escape openings 31 (Fig. 2) allow the escape of the cooling medium emanating from the rotor cooling canals 19.

The inner guide body 4, in this instance in the form of a drum, has entrance openings 32 (Fig. 2) to allow the entrance of air or of another cooling medium into the cooling canals 19 of the rotor 1. Drum or inner guide body 4 is connected in fixed relation to the housing or outer guide body 3.

A space 33 is provided between shaft 2 (Fig. 2) and sleeve 34, the latter being screwed or otherwise fastened to collar or shoulder 34a arranged for support by outer guide body plate 6.

Rotor disc 12 is adapted to revolve by means of ball bearing 36 around stationary sleeve 34. To suitably support the inner guide body 4, bearings 35a may be disposed between shaft 2 and sleeve 34. Shaft bearings 35 and 36b are provided at opposed sides of the turbine.

The cooling medium enters in axial direction through apertures 37 of outer guide body plate 6 and thence passes according to arrows A in axial direction of shaft 2 through cut-outs 14 which are provided in rotor disc 12, and is finally urged by means of a violent automatic suction in substantial radial direction through openings 32 within drum 4 into the cooling medium directing means or cooling canals 19 and from these cooling canals 19 through openings 31 of the housing 3 preferably into the atmosphere, thereby effectively cooling the drum 4, the canals 17 of the power medium and the housing 3. The air surrounding the outer rotor periphery is hurled or pushed aside from the outer rotor periphery because of the high speed of the revolving rotor and therefore is creating almost an absolute vacuum, thereby making room for the following air incoming on the inner rotor periphery, in some modifications through the cooling canals 19 and in other modifications direct through the power canals 17 on account of the existing difference of atmospheric pressure between the inner and outer peripheries during rotation of the rotor.

The driving or power medium, such as gas, steam and the like is injected into the rotor power canals or ducts of the turbine, preferably by means of one or more nozzle means 40 which may include a short constriction forming a neck 40a acting according to the Bernoulli effect. Each nozzle means may be provided with a cooling jacket 41 and has further a spring supported resistance compression shutter or resistance compression valve 42 (Fig. 2d). The compression shutter or valve 42 may be opened and closed at predetermined intervals and may be timed with the ignition and discharge of the driving medium by any appropriate means, such as eccentric or cam gears 43, 43a, as shown and employed for valves 44, 45 hereinafter described (Fig. 2d).

In case of an internal combustion turbine, the nozzle means 40 is integral or in another manner connected with the discharge unit 38 comprising an explosion or expansion chamber 46 with means for scavenging the used power medium (not shown on the drawings); a pre-compression chamber 47, a feeding chamber 48 with flange connection 50. The pre-compression chamber 47 and explosion chamber 46 contain said valves 44 and 45.

Explosion chamber 46 further contains the ignition device 49. Feeding chamber 48 may be constantly filled with fresh driving medium from a gas compressor (not shown) which is connected to flange connection 50.

When valve 44 opens (by means of action of cam 43), gas enters from the feeding chamber 48 into the pre-compression chamber 47 from where the gas is introduced into the explosion chamber 46 through valve 45, actuated in predetermined intervals by cam 43a. After closing valve 45, the ignition device 49 ignites the compressed gas, and the gas expansion caused by the explosion opens the nozzle compression shutter 42 and the now expanding gas passes through the nozzle 40 into the rotor power canals 17.

The expanding gas in each power canal 17 causes an impulse upon rotor 1 in desired direction, in the present instance in a clockwise direction. The expanding gas while passing through canals 17 will be compressed and/or its speed will be increased, due to the fact that the power canals 17 are tapered towards the inner rotor periphery. The inner and outer guide bodies comprise either guide pockets, and/or guide pocket units or guide canals. The guide pocket units comprise either curved guide elements or guide ducts.

In this instance, the inner guide pocket units 52, 53, 54 are divided by respective curved guide elements 52a, 53a, 54a and having the respective curved guide walls 52b, 53b, 54b.

Referring in particular to inner guide pocket unit 52, it will be realized that if the power medium (gas) is supplied by nozzle 40 to power canal 17a, the power medium will then expand within the inner guide pocket unit 52. The curved guide elements 52a and the curved guide pocket wall 52b provided within the inner guide body or drum 4 cause a flow of the combusted power medium in the direction of arrow 55 so that the power medium enters into the rotor power canals 17c and 17d toward the outer guide pocket units 62, while the remainder of the power medium within canal 17b is still moving toward the guide elements 52a within the inner guide pocket unit 52.

The outer guide body or housing 3 comprises guide pocket units 62, 63, etc. Guide pocket units 62 has the curved guide elements 62a and the curved guide pocket wall 62b, which causes the power medium having subsequently expanded again to enter into the moving power canals 17g, 17f, 17e within which the power medium is compressed again toward the inner guide body and passes then into the next inner guide pocket unit 53.

The inner guide pocket unit 53 is equipped with the curved guide elements 53a and has the curved inner guide pocket wall 53b which guide the now further expanding power medium into the rotor power canals 17—l, 17k, 17i, 17h, which are moving past guide pocket unit 53.

From these power canals 17h, 17—l, the power medium further expands into the following outer guide pocket units 63 having the curved guide elements 63a and the further curved outer guide pocket wall 63b. Due to the curvature of the guide elements 63a and of the guide pocket wall 63b, the expanding power medium is conducted back into the moving rotor 1 and through its power canals 17m to 17r, in the direction of arrow 65. While passing through these power canals 17m, 17q, 17r, the impulse of the power medium is still exerted against the walls of the power canals toward the ends of which the power medium is again somewhat compressed.

The power medium from the power canals 17m to 17r further expands into the following inner guide pocket units 54 having the curved guide elements 54a and the respective curved guide pocket wall 54b from where the power medium still further expands into the following rotor power canals with the result that the power medium is only capable of exerting negligible pressure and is allowed to escape through exhaust opening 50 into the atmosphere or a suitable receptacle, if desired. While the gas finally escapes through said exhaust opening 30, the rotor power canals still receive an impulse which is caused by the reaction resulting from the characteristic curvature of the rotor power canals 17 and due to the opposed ends thereof.

Each time the power medium passes from the inner and outer guide bodies to the rotor and vice versa, an additional impulse against the rotor takes place by way of either action or reaction.

Although the rotor is being rotatably moved, due to the action, reaction and expansion of the power medium, the rotor (for the purpose of explaining the conduct of the power medium through the inner and outer guide pockets and through the rotor and for the sake of simplifying a full understanding of the invention) is assumed to be stationary with respect to these guide pockets.

It is self-evident that the turbine may be variously modified in that instead of power canals in the rotor, power ducts may be used which may form a unit, and instead of guide pocket units with guide members, such with guide ducts, and instead of guide pockets guide canals may be used in the housing 3 and drum 4.

If continuous flow of combustible gas is used as the preferred power medium, elements subjected to explosion, or if steam or water are employed instead of gas, the explosion chamber 46 and other parts as shown in Figs. 1, 2, 2d, as well as the compression shutter 42 within the nozzle means 40 may be omitted.

The number of the power canals 17 may vary and their shape is preferably oblong, whereas the various guide pockets with the guide elements or members (or guide ducts or guide canals) are made according to the size of the turbine and are chosen according to the characteristics of the power medium employed and its ability of expansion.

In order to prevent the power medium from escaping from the combustion or explosion chamber through the nozzle 40 into the rotor power canals before the power medium has reached its highest degree of compression so that it may be ignited at the proper time and brought to explosion, the compression shutter is normally closed, either by a spring or other suitable means in order to resist the predetermined pressure of the compressed power medium and opens only when its resistance is overcome by the force of explosion or other excessive pressure from the power medium which will overcome the predetermined pressure of the spring or other suitable means attached to the explosion or pre-compression chamber. If the resistance compression shutter or resistance compression valve 42 is opened and closed at predetermined intervals and timed with the ignition and discharge of the driving medium, it will be actuated by any appropriate means, such as excentric or cam gears 43, 43a, as for instance shown and employed for valves 44, 45, previously described.

Figures 4, 5:
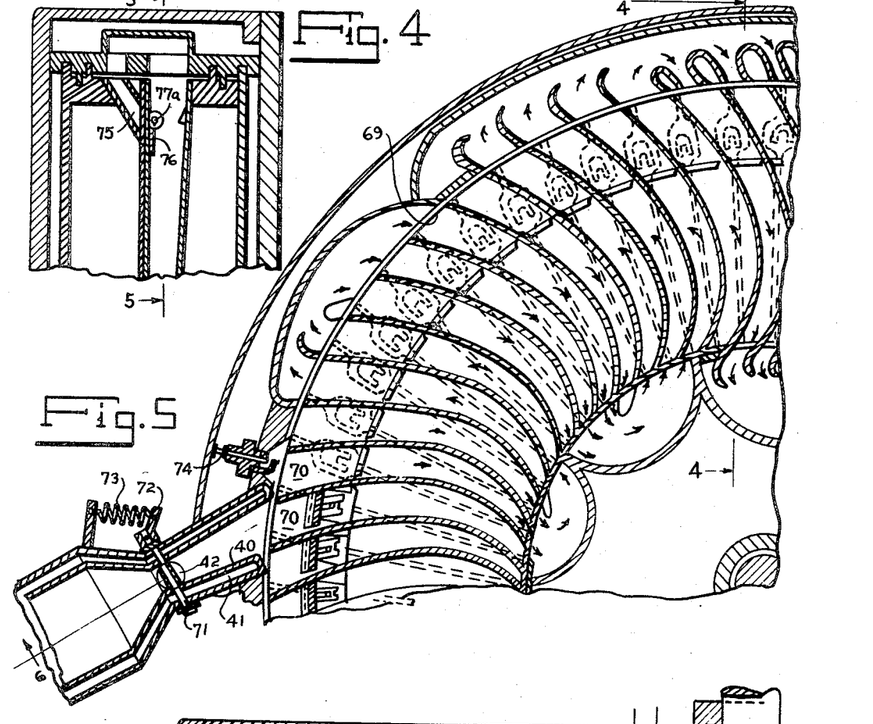
Fig. 4 is a fragmentary vertical section through a modified form of the present invention taken along line 4—4 of Fig. 5.
Fig. 5 is a fragmentary and horizontal sectional view of a modified form of the invention taken along line 5—5 of Figs. 4 and 6.
Figure 6:
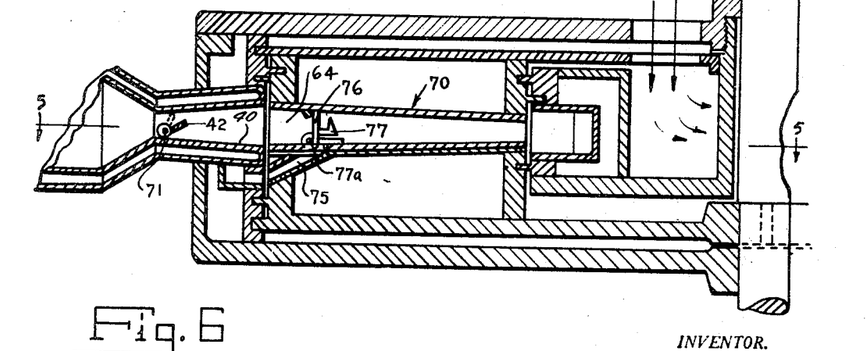
Fig. 6 is a vertical sectional view of the turbine in modified form and taken along line 6—6 of Fig. 5.

It is preferred to carry out this feature of the invention in the manner shown more clearly in the enlarged embodiments of Figs. 5 and 6 where it will be seen that a pivotal shaft 71 to which the power operated or compression shutter is secured, carries a lever 72 (Fig. 5) upon which acts a spring member 73 in such a manner that compression shutter 42 (Figs. 1, 2, 2c, 2d, 5, 6, 11) is held normally in closed position, as illustrated in Fig. 2d and in dot-dash lines in Fig. 6, and will thus close the nozzle 40.

As soon as the explosion takes place within the explosion chamber 46, or if compressed gas alone is being employed, the impact of the exploded or expanding power medium, as the case may be, will move the compression shutter 42 into a position illustrated in Figs. 1, 2 and 6 and will thus open the nozzle 40 to allow the passage of the power medium.

In order to avoid detrimental counterflow of the power medium during its passage through the rotor I and the inner and outer guide bodies, arrangements may be made in the guide pockets and/or in sections of the guide bodies in relation to the power canals 17 to prevent the moving power canals during their discharge periods from receiving a further quantity of power medium from said guide pockets.

To this end, sections 66, 66a, 66b, etc. of the inner rim part 3a of housing 3 and sections 67, etc. of the outer rim part 4a of drum 4 within or adjacent the outer and inner guide pocket units, seal the power canals 17 during a portion of the revolution of the rotor, thereby preventing any supply of said medium to those power canals which were not yet completely emptied.

According to the modifications of the turbine structure shown in Figs. 4 to 10, the explosion (in the case of an internal combustion turbine) takes place in the rotor power canals themselves. In this instance, the explosion chamber 46 (Fig. 2d) of the discharge unit 38 may be dispensed with and the pre-compression chamber 47 (Fig. 2d) is directly connected (not shown) to the nozzle 40 from which the fresh charge of the highly compressed power medium enters the power canals 70 where the power medium is initially stopped or arrested by a compression shutter 76 which is hingedly secured at 77a where, if desired, each power canal 70 meets a branch canal 75 (Figs. 4 and 6). This compression shutter 76 serves the same purpose as a piston in a conventional combustion engine.

Each power canal 70 contains such a compression shutter 76 whose actuation may be effectuated by the centrifugal force during rotative movement of the rotor.

Therefore that portion 64 of the power canals between the outer rotor periphery and the compression shutter 76 (in closed condition) constitutes during the closure period an explosion chamber.

While rotor 69 (Fig. 5) rotates in clockwise direction, the power canal 70 (Figs. 5, 6) moves toward the spark plug or ignition means 74 (Fig. 5). The power medium in this explosion chamber 64 moves together with the power canals 70 to the position adjacent the ignition means 74 and is there ignited. As a consequence of the force of the resulting explosion the respective compression shutter 76 is then moved into such a position in which it opens the power canal 70. Branch canal 75 connected to canal 70 is then closed by the compression shutter 76 (Figs. 4 and 10).

The expansion of the exploded power medium causes the latter to move in substantially the same manner as described with reference to Figs. 1 and 2, namely, through the rotor, the inner and outer guide bodies and parts thereof.

Figure 12:
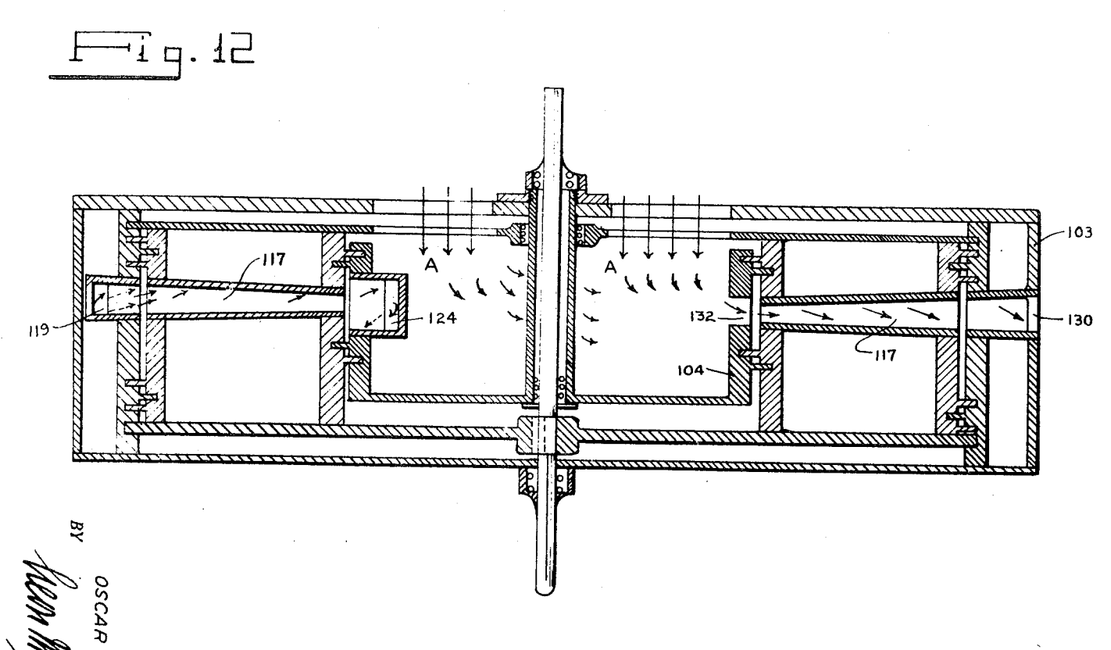
Fig. 12 is a vertical sectional view of the rotor of Fig. 11 taken along line 12—12 of said Fig. 11.

Shutter 76 is retained in the aforesaid position (Fig. 10) until the power medium is fully expanded and the latter will then escape through an exhaust opening in the housing in the same manner as the power medium escapes through the exhaust opening 30 shown in Figs. 1 and 2, or through the exhaust opening 130 shown in Fig. 12. Obviously, this modification as shown in Figs. 4 to 10, may also be provided with cooling canals, as hereinabove described.

Figure 7:
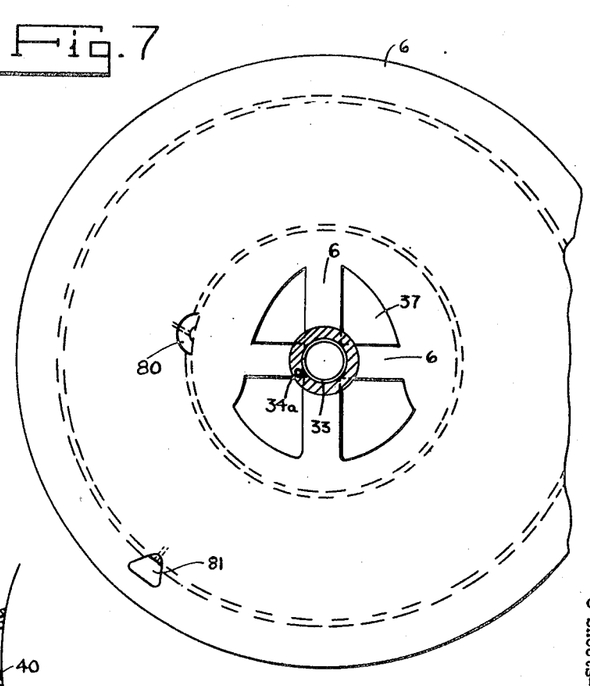
Fig. 7 is a top plan view of the turbine of Fig. 1 or Fig. 5.
Figure 8:
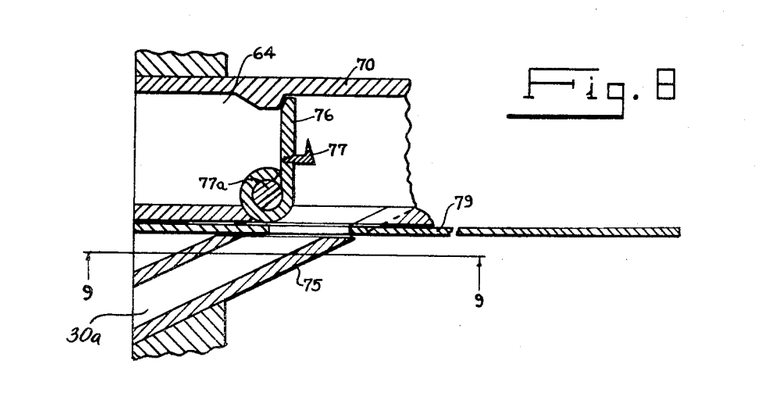
Fig. 8 is a cross-sectional view of the shutter used in the power canal of the modification shown in Figs. 4–6, inclusive.
Figure 9:
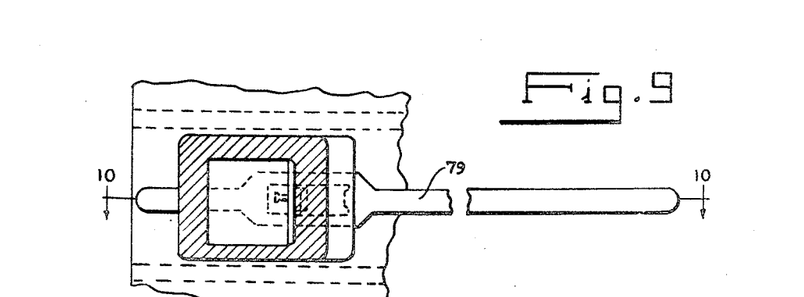
Fig. 9 is a horizontal sectional view taken along line 9—9 of Fig. 8.
Figure 10:
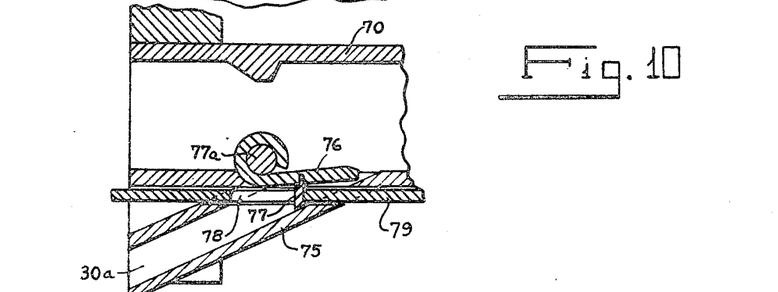
Fig. 10 is also a cross-sectional view of the shutter of Figs. 8 and 9 taken along line 10—10 of Fig. 9, showing said shutter in another position.

Shutter 76, in this instance, is retained in its position of Fig. 10 by means of a hook 77 which is fixedly secured to each shutter 76 and which engages with slot 78 provided in a control organ in the form of a rod 79 (Figs. 8, 9, 10). Each rod 79 is radially slidably supported with respect to each power canal 70 and is adapted to be engaged at either end by one of the cams 80 disposed at the outer periphery of the drum 4 or by cam 81 arranged at the inner periphery of the housing 3 (Fig. 7). Cam 80 pushes during rotation of the power canal 70 rod 79 outwardly toward the housing 3 so that the respective rod 79 engages a respective hook 77, as may be depicted in Figs. 4 to 10, whereas cam 81 pushes the rod 79 during rotation of the power canal 70 toward the drum 4 so that the rods release the respective hooks 77, as may be realized from Figs. 6 and 8.

The shutters 76 thus released can now close the main power canals 70 by means of the centrifugal force acting upon the shutters 76. The portion of the power medium having passed all stages of the rotor but having not escaped yet through the exhaust opening of the main power canal 70 escapes through the exhaust opening 30a of the branch canal 75 (Fig. 8) in the manner that the exhaust gas leaves the rotor through the open branch canal 75, while the shutter 76 is again in closing position within the power canal 70.

If preferred, the exhaust gas may leave by way of the power canal 70 itself and then through an exhaust opening located within the adjacent outer guide body or housing in the same manner as the power medium escapes through the exhaust opening 30 located within the adjacent outer guide body or housing shown in Figs. 1 and 2, or through the exhaust opening 130 shown in Fig. 12, in which case the engagement of the hook 77 with slot 78 of rod 79 is to be properly timed so as to keep during the period of explosion and expansion the main power canal 70 open and the branch canal 75 closed.

In Figs. 6 and 8 is illustrated the position during which the power canal 70 has been closed and the branch canal 75 opened, after hook 77 has been released from its engagement with slot 78 of the slidably supported control rod 79 by outer cam 81. The latter cam 81 is indicated in Fig. 7 at the outer guide body. In Figs. 4 and 10 shutter 76 is illustrated the position during which power canal 70 is open in order to allow escape of power medium through an exhaust opening located within the outer guide body adjacent to the rotor main power canal 70, in the same manner as the power medium escapes through the exhaust opening 30 located within the outer guide body adjacent to the rotor main canal 17 illustrated in Fig. 1. During the period that the main power canal 70 is open, the branch canal 75 is closed by shutter 76 retained by means of hook 77 engaged with slot 78 provided in the slidably supported control rod 79 which latter has been moved during rotation of the rotor towards the outer guide body by inner cam 80 indicated in Fig. 7 at the inner guide body.

Fig. 8 shows that the right side of the top of the open branch canal 75 is vacant, meaning that no portion of the control rod 79 covers the right side of the top of the branch canal 75, whereas the left side of the top of the branch canal 75 is in part covered by a portion of the control rod 79.

Further is shown that the distance between the right end of slot 78 of control rod 79 and the center of hinge 77a is larger than in Fig. 10, also that the left end of control rod 79 is even or level with the left hand boundary line of Fig. 8, indicating that control rod 79 on its left end has been pushed by cam 81 located on the outer guide body (Fig. 7) towards the inner guide body, thereby releasing compression shutter 76 (Fig. 8) having been engaged by means of its hook 77 with slot 78 of the control rod 79 (Fig. 10) and herewith opens main power canal 70 (Fig. 8).

Fig. 10 shows in comparison with Fig. 8, that the right side of the top of the branch canal 75 is in part covered by a portion of control rod 79, whereas the left side of the top of the open branch canal 75 is vacant, showing that no portion of the control rod 79 covers the left side of the top of the open branch canal 75; Fig. 10 also shows that the distance between the center of the hinge 77a and the right end of slot 78 is smaller than in Fig. 8; it also shows that the left end of control rod 79 protrudes the left hand boundary line of Fig. 10 indicating that control rod 79 on its right end has been pushed by cam 80 located on the inner guide body (Fig. 7) towards the outer guide body thereby engaging hook 77 of compression shutter 76 with slot 78 of the control rod 79 and simultaneously opening power tube 70.

During the period of explosion and expansion, the power medium imparts its main driving impulse upon the rotor 69 in a manner similar to that described with respect to rotor 1.

In turbines without cooling canals (Figs. 11, 12), any suitable means, such as openings 132 of various dimensions (Fig. 11) or openings of equal dimensions may be provided for within the outer rim part 4a of the inner guide body or drum 104 (Fig. 11) to allow and regulate the incoming supply of cooling air or other cooling medium along and within the power canals 117 for the purpose to prevent excessive differences in temperatures within the power canals.

Figure 11:
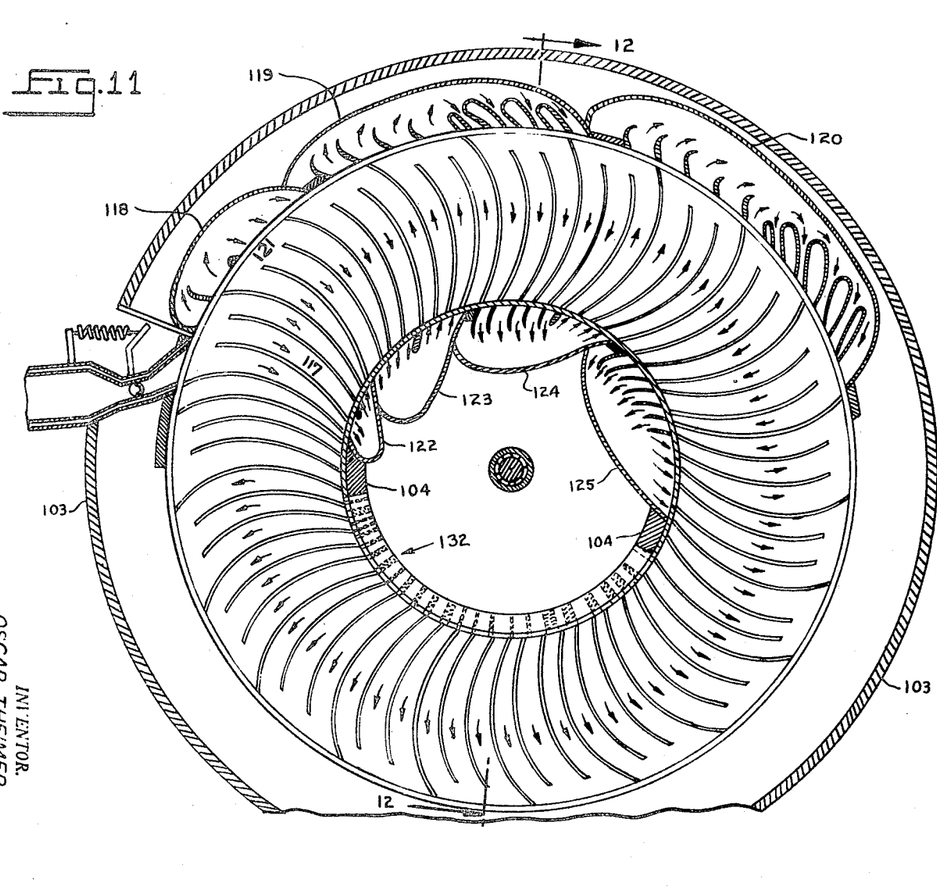
Fig. 11 is a horizontal sectional view of the turbine of still another embodiment of the invention.

In the embodiment shown in Fig. 11, the rotor includes a predetermined number of full length and of shortened canals, respectively, toward the outer rotor periphery providing thereby receiving chambers which are enclosed by the respective rim parts of the outer guide body. From such receiving chambers, gas is directed through the rotor canals. Receiving chambers may in the same way be provided for at opposed sides of canals which receiving chambers will be enclosed by the respective rim parts of the inner guide body. From the receiving chambers gas is directed, and if provided for, gas and cooling medium is alternately directed through the rotor canals. The receiving chambers counteract partially the detrimental effect resulting due to the high speed of the rotor. The power medium is caused to expand continuously from one rotor stage section to another rotor stage section and through the outer guide body stage sections 118, 119 and 120 and the inner guide body stage sections 122, 123, 124 and 125.

The cooling medium entering through said openings 132 in drum 104 into the rotor power canals 117 escapes from the latter through openings 130 of housing 103 into the atmosphere or any suitable receptacle (not shown), thereby cooling hot power canals 117.

In accordance with the above it is well understood that deviations and changes may be made from the embodiment herein set forth without departing from the spirit of this invention.

Having thus described the invention, what is claimed as new and desired to be secured by Letters Patent, is:

1. A turbine of the character described comprising a rotor, an inner guide body, an outer guide body, said rotor being provided with an inner rim member and with an outer rim member and being positioned intermediate said inner guide body and said outer guide body, radially extending rotor canal means for directing a power medium supported by said inner rotor rim member and said outer rotor rim member, said inner guide body being provided with an outer rim part including passage openings, said outer guide body being provided with an inner rim part including escape openings, radially extending rotor canal means for directing a cooling medium and surrounding said directing rotor canal means for said power medium, said power medium directing rotor canal means and said cooling medium directing rotor canal means tapering toward said inner guide body, said inner guide body including a plurality of inner guide pocket units, said inner guide pocket units being positioned adjacent said inner rotor rim member, said outer guide body including a plurality of outer guide pocket units, said outer guide pocket units being adjacent said outer rotor rim member, nozzle means for supplying said power medium to said power medium directing rotor canal means, cooperable gas trap sealing extension means at said inner rotor rim member and at said outer rotor rim member engaging, respectively, said inner guide body rim part and said outer guide body rim part, a shaft extending through said inner guide body and projecting therebeyond, a first outer guide body plate, a second outer guide body plate, both said guide body plates being connected to said outer guide body, at least one of said guide body plates being provided with apertures, a sleeve surrounding said shaft, said inner guide body being fixed to said sleeve and mounted thereon for support, a first rotor supporting member, a second rotor supporting member, said rotor being connected to said rotor supporting members for support, one of said rotor supporting members being fixed to said shaft, the other of said rotor supporting members being journaled on said sleeve, said shaft being rotatable within said sleeve, at least one of said rotor supporting members being provided with passageways, said apertures and said passageways communicating with said directing rotor canal means for said cooling medium, said outer guide body including exhaust means for the passage of the power medium after expansion thereof, said power medium when supplied by said nozzle means expanding within said power medium directing rotor canal means and being deviated, respectively, by said inner guide pocket units and said outer guide pocket units in a substantially continuous course.

2. A turbine as claimed in claim 1, wherein said outer guide body and said inner guide body are provided with openings communicating with said cooling medium directing rotor canal means to permit entrance and escape of said cooling medium.

3. A turbine of the character described comprising a rotor, an inner guide body, an outer guide body, said rotor being provided with an inner rim member and with an outer rim member and being positioned intermediate said inner guide body and said outer guide body, radially extending rotor canal means for directing a power medium and supported by said inner rotor rim member and said outer rotor rim member, said inner guide body being provided with an outer rim part, said outer guide body being provided with an inner rim part, radially extending rotor canal means for directing a cooling medium and surrounding said power medium rotor canal means, said power medium rotor canal means and said cooling medium directing rotor canal means tapering from the outer guide body toward said inner guide body, said inner guide body including a plurality of inner guide pocket units each including a plurality of guide members for directing said power medium toward said power medium rotor canal means, said outer guide body including a plurality of outer guide pocket units each including a plurality of guide members for redirecting said power medium toward said canal means, nozzle means for supplying said rotor power medium to said rotor canal means, cooperable gas trap sealing extension means at said inner rotor rim member and at said outer rotor rim member, engaging, respectively, said inner guide body rim part and said outer guide body rim part, a shaft extending through said inner guide body and projecting therebeyond, a first outer guide body plate, a second outer guide body plate, both said guide body plates being connected to said outer guide body, at least one of said guide body plates being provided with apertures, a sleeve surrounding said shaft, said inner guide body being fixed to said sleeve and mounted thereon for support, a first rotor disc, a second rotor disc, said rotor being connected to said rotor discs for support, one of said rotor discs being fixed to said shaft, the other of said rotor discs being journaled on said sleeve, said shaft being rotatable within said sleeve, at least one of said rotor discs being provided with cut outs, said apertures and said cut outs communicating with said directing rotor canal means for said cooling medium, said outer guide body including exhaust means for the passage of the power medium after expansion thereof, respective inner guide body pocket units, said rotor power canal means and outer guide pocket units being positioned with respect to one another so as to provide a continuing working area, said power medium when supplied by said nozzle means expanding within said power medium directing rotor canal means and being deviated, respectively, by said inner guide pocket units and said outer guide pocket units in a substantially continuous course.

4. A turbine according to claim 3, wherein a chamber is provided between said cooling medium directing means and said cut outs and extends lengthwise of said sleeve.

5. A turbine according to claim 2, wherein the cooling medium is atmospheric air, which enters said apertures and cut outs, passes through said openings of the inner guide body and said cooling medium directing rotor canal means and escapes through said openings of said outer guide body, said inner guide body being spaced from said sleeve to provide a chamber affording during rotation of said rotor on account of the high speed a difference of atmospheric pressure for an air stream between said apertures and cut outs in said guide body plate and rotor supporting member and said openings in said outer guide body, to automatically provide air circulation in consequence of suction resulting from said differences of atmospheric pressure between the outer and inner rotor peripheries during rotation of the rotor by which said power-medium directing rotor canal means and said inner guide body and said outer guide body are cooled.

6. A turbine according to claim 3, wherein said power medium rotor canal means are curved in the direction of rotation of said rotor, said power medium rotor canal means being open at opposed ends thereof, thereby affording expansion and passage of the power medium therethrough.

7. A turbine of the character described comprising a vertical shaft surrounded by a sleeve, two rotor supporting discs, one of said discs being fixed to said shaft and rotatable therewith, the other of said discs being journaled on said sleeve and being rotatable thereabout independently of said shaft, a housing enclosing said discs, said housing having an inner rim part provided with grooves for engagement with said discs, respectively, a rotor supported by said one disc and rotatable therewith relatively to said other disc, said rotor being arranged between said discs and spaced from said shaft providing therebetween a chamber, cooling canals each surrounding a respective portion of the rotor and being rotatable with the latter, means facilitating introduction of a cooling medium parallel to the axis of said shaft, said latter introduction means and said cooling canals being connected with each other through said chamber, gas trap sealing grooves provided at said inner rim part of said housing, gas trap extension sealing means adjacent the ends of said canal means and of said portions of said rotor, respectively, engaging said gas trap sealing grooves within said rim part of said housing, and nozzle means projecting between two adjacent of said sealing means in said housing for supplying a power medium to said portions of said rotor, said cooling medium rotor canals communicating with openings provided in said housing so as to guide said cooling medium out of said housing angularly to the direction of introduction of the same into said housing.

8. A turbine of the character described comprising a vertical shaft surrounded by a sleeve, two rotor supporting discs, one of said discs being fixed to said shaft and rotatable therewith, the other of said discs being journaled on said sleeve and being rotatable thereabout independently of said shaft, a housing enclosing said discs, said housing having an inner rim part provided with grooves for engagement with said discs, respectively, a rotor supported by said one disc and rotatable therewith relatively to said other disc, said rotor being arranged between said discs and spaced from said shaft providing therebetween a chamber, a stationary inner guide body surrounding said shaft and including an outer rim part, said rotor including power canals, cooling canals surrounding said power canals and rotatable with said power canals, means facilitating introduction of a cooling medium parallel to the axis of said shaft, said introduction means and said cooling canals being connected with each other through said chamber, gas trap sealing groove means provided at said inner rim part of said housing and at said outer rim part of said inner guide body, gas trap extension sealing means adjacent the ends of said cooling canals and of said rotor power canals, respectively, engaging said gas trap sealing grooves, and nozzle means supplying a power medium to said rotor power canals, said cooling medium rotor canals communicating with openings provided in said inner rim part of said housing so as to direct said cooling medium out of said housing and angularly to the stream of cooling medium into said housing.

9. A turbine of the character described comprising a shaft, a rotor connected with said shaft and for rotation therewith, a sleeve surrounding said shaft, an outer guide body, an inner guide body, said rotor being positioned intermediate said outer guide body and said inner guide body, respective gas trap sealing extension means provided on said rotor sealingly engaging gas trap sealing grooves provided in said outer guide body and said inner guide body, first supporting means for said rotor connected with said shaft, second supporting means for said rotor journaled on said sleeve, nozzle means for supplying a power medium to said rotor, said rotor being provided with a plurality of stage sections, said stage sections permitting continuous expansion of said power medium and being arranged successively to each other, each stage section having substantially the same distance from said shaft and including power canals different in number but equal in radial length and radial weight, and rotor canal means directing a cooling medium and surrounding each rotor power canal, said cooling medium directing means being connected with said power canals, respectively, for rotation with said rotor, each power medium rotor canal and each cooling medium rotor canal being curved and forms a part of an absolute or approximate logarithmic spiral.

10. A turbine of the character described comprising a shaft, a rotor connected with said shaft and for rotation therewith, a sleeve surrounding said shaft, an outer guide body, an inner guide body, said rotor being positioned intermediate said outer guide body and said inner guide body, respective gas trap sealing extension means provided on said rotor sealingly engaging said outer guide body and said inner guide body, first supporting means for said rotor connected with said shaft, second supporting means for said rotor journaled on said sleeve, nozzle means for supplying a power medium to said rotor, said rotor being provided with a plurality of stage sections, said stage sections permitting continuous expansion of said power medium and being arranged successively to each other, each stage section having substantially the same distance from said shaft, each rotor stage section including power canals different in number but equal in radial length and radial weight, outer guide pocket units and inner guide pocket units circumferentially positioned, respectively, at opposed ends of said power canals, means for directing a cooling medium and surrounding each power canal, said latter means permitting the passage of a cooling medium from one end to the other end of said cooling medium directing means, said outer guide pocket units and said inner guide pocket units communicating with said power canals, respectively during rotation of the latter, means for obstructing the passage from said outer guide pocket units and said inner guide pocket units to said cooling medium directing means.

11. A turbine of the character described comprising a shaft, a rotor connected with said shaft and for rotation therewith, a sleeve surrounding a portion of said shaft, means connected with said rotor and journaled on said sleeve for rotation thereabout, an outer guide body, an inner guide body, said rotor being positioned between said outer guide body and said inner guide body, respective gas trap sealing extension sealing means provided on said rotor and engaging gas trap grooves within said outer guide body and said inner guide body, nozzle means supplying a power medium to said rotor, said rotor being divided into stage sections, said stage sections permitting continuous expansion of said power medium and being arranged successively to each other, each stage section having substantially the same distance from said shaft and including a predetermined number of power canals, each of said power canals being equal in radial length and radial weight, said outer guide body including a predetermined number of outer guide pocket units, said inner guide body including a predetermined number of inner guide pocket units and positioned substantially opposite said outer guide pocket units, said outer guide pocket units and said inner guide pocket units extending a circumferential portion of said outer guide body and of said inner guide body, respectively, inlet means forcing a cooling medium parallel to the axis of said shaft, and cooling medium directing rotor canal means surrounding said rotor power canals, respectively, said cooling medium directing means permitting the passage of a cooling medium from one end to the other and lengthwise of said power canals, said inner guide body and said outer guide body including respective passageways permitting flow of said cooling medium from said inlet means through said cooling medium directing rotor canal means and between said inner guide body and said outer guide body lengthwise of said power canals, means and arrangements provided for in the guide pocket units or in sections of the guide bodies in relation to the power canals avoiding detrimental counterflow during its passage of the power medium through the rotor and the inner and outer guide bodies, by preventing the moving power canals during their discharge periods from receiving a further quantity of power medium from said guide pocket units.

12. A turbine of the character described comprising a shaft, a rotor connected with said shaft and for rotation therewith, a sleeve surrounding a portion of said shaft, means journaled on said sleeve and connected with said rotor to facilitate rotation of said rotor about said sleeve, an outer guide body, an inner guide body, said rotor being positioned between said inner guide body and said outer guide body, respective means for sealing said rotor relatively to said outer guide body and said inner guide body, nozzle means supplying a power medium to said rotor, said rotor comprising a plurality of rotor stages, each rotor stage including a plurality of power canals affording enclosed condition of power medium while passing through the power canals during rotation thereof, said inner guide body being spaced from said shaft providing therebetween a chamber, means arranged to facilitate introduction of a cooling medium parallel to said shaft, said introduction means and said power canals being connected with each other through said chamber, said outer guide body and said inner guide body being provided with openings communicating with said chamber and said power canals to permit automatic entrance, flow and escape of said cooling medium through said power canals as a consequence of suction produced due to rapid revolution of said rotor, said outer guide body and said inner guide body, respectively, including inner guide body stage sections and outer guide body stage sections, said inner guide body stage sections and said outer guide body stage sections extending in circumferential direction along at least a portion of the inner and outer periphery of said rotor, respectively, corresponding inner guide body stage sections and outer guide body stage sections being different in size and area, whereby said power medium is caused to expand continuously from the power canals of one rotor stage section to the power canals of another rotor stage section through coresponding inner guide body stage sections and outer guide body stage sections.

13. A rotor of the character described comprising a shaft, a rotor connected with said shaft for rotation therewith, an inner guide body, an outer guide body, said rotor including more than one row of power canals surrounded by cooling canals arranged in superposed position for rotation with said shaft, a sleeve surrounding a portion of said shaft, means journaled on said sleeve, said rotor being positioned between said outer guide body and said inner guide body, respective extension and groove means for sealing said rotor, respectively, each row of said power canals relatively to said outer guide body and said inner guide body nozzle means supplying a power medium to each row of said power canals within said rotor, said rotor comprising a plurality of rotor stage sections including said rows of power canals surrounded by cooling canals, a corresponding portion of said outer guide body and a corresponding portion of said inner guide body including each a plurality of outer guide body stage sections and inner guide body stage sections, said outer guide body stage sections and said inner guide body stage sections extending in circumferential direction along at least a portion of the outer and inner periphery of said rotor, respectively, whereby said power medium is caused to expand continuously from one rotor stage section to another rotor stage section of each of said rows of power canals and through corresponding inner guide body stage sections and outer guide body stage sections.

14. A turbine of the character described comprising a shaft, a rotor connected with said shaft and for rotation therewith, an outer guide body, an inner guide body, said guide bodies being provided with respective rim parts, said rotor being positioned between said outer guide body rim part and said inner guide body rim part, interchangeable radially extending rotor canal means for directing a power medium, interchangeable radially extending rotor canal means for directing a cooling medium, gas trap means provided at said inner rim part of said outer guide body and at said outer rim part of said inner guide body, rotor gas trap extension means adjacent opposed ends of said power medium directing rotor canal means and of said cooling medium directing rotor canal means, respectively, said gas trap extension means being cooperable with said guide body rim part gas trap means, nozzle means for supplying a power medium to said rotor, and a predetermined number of outer and inner guide ducts circumferentially positioned at the outer and inner rotor peripheries, respectively, and at opposed ends of said power medium directing means.

15. A turbine of the character described comprising a shaft, a rotor connected with said shaft and for rotation therewith, a sleeve surrounding said shaft, means journaled on said sleeve and connected with said rotor to facilitate rotation of said rotor about said sleeve, an outer guide body and an inner guide body being provided with respective rim parts, said rotor being positioned between said outer guide body and said inner guide body, radially extending means for directing a power medium, radially extending means for directing a cooling medium, gas trap grooves and means provided at said inner rim part of said outer guide body and at said outer rim part of said inner guide body, rotor extension means adjacent opposed ends of said power medium directing means and of said cooling medium directing means, respectively, engaging said gas trap grooves and means, nozzle means for supplying a power medium to said rotor, first means supporting said rotor and connected with said shaft, second means supporting said rotor and journaled on said sleeve, a predetermined number of outer and inner guide canals circumferentially positioned adjacent along the outer and inner rotor peripheries, respectively, at opposed ends of said power medium directing means.

OSCAR THEIMER.

REFERENCES CITED

The following references are of record in the file of this patent:

UNITED STATES PATENTS

| Number | Name | Date |
|---|---|---|
| 767,189 | Weichelt | Aug. 9, 1904 |
| 787,907 | Farwell | Apr. 25, 1905 |
| 842,211 | Kolb | Jan. 29, 1907 |
| 846,855 | Karlson | Mar. 12, 1907 |
| 1,139,465 | Dake | May 11, 1915 |
| 1,289,960 | Taylor | Dec. 31, 1918 |
| 2,131,047 | Holzwarth | Sept. 27, 1938 |
| 2,332,866 | Müller | Oct. 26, 1943 |

FOREIGN PATENTS

| Number | Country | Date |
|---|---|---|
| 2,818 | Great Britain | of 1906 |
| 177,818 | Germany | Nov. 23, 1906 |
| 383,287 | Germany | Oct. 12, 1923 |
| 442,504 | France | of 1912 |